United States Patent [19]

Potts, Sr. et al.

[11] Patent Number: 5,349,526

[45] Date of Patent: Sep. 20, 1994

[54] SYSTEM AND METHOD FOR CONVERTING SENTENCE ELEMENTS UNRECOGNIZABLE BY A COMPUTER SYSTEM INTO BASE LANGUAGE ELEMENTS RECOGNIZABLE BY THE COMPUTER SYSTEM

[75] Inventors: George W. Potts, Sr., Wellesley; Patrick Breen, Medford; Robert Paushter, Watertown, all of Mass.

[73] Assignee: Occam Research Corporation, Waltham, Mass.

[21] Appl. No.: 741,306

[22] Filed: Aug. 7, 1991

[51] Int. Cl.⁵ .............................. G06F 15/40
[52] U.S. Cl. .............................. 364/419.1
[58] Field of Search ............... 364/419, 419.1, 419.14, 364/144, 419.19; 395/151

[56] References Cited

U.S. PATENT DOCUMENTS 5,153,831 10/1992 Yianilos ................... 364/419
5,224,038 6/1993 Bespalko ................. 364/419

Primary Examiner—Roy N. Envall, Jr.
Assistant Examiner—X. M. Chung-Trans
Attorney, Agent, or Firm—Joseph S. Iandiorio

[57] ABSTRACT

A system and method for converting inoperative sentence elements into operative elements in which a set of grammar rules for substituting sentence elements with different elements is established. A sequential comparison between each grammar rule and the sentence elements is then accomplished to find a match between a grammar rule and one or more contiguous sentence elements. A substitution of the matched element for the different elements from the grammar rule is then accomplished. Such sequential comparison and substitution is continued for the entire series of sentence elements to fully convert the sentence to operative elements.

20 Claims, 3 Drawing Sheets

Sentence Transformation          Grammar Rules

10 — A B C D E                    Rule 1. "BC" is "BBB"
         ↓
12 — A B F E                       Rule 2. "BBD" is "F"

1st Substitution   10                           14
    A [BC] D E   ——Rule 1——▶  A [BBB] D E 2nd Substitution   14                           12
    A B [BBD] E  ——Rule 2——▶  A B [F] E

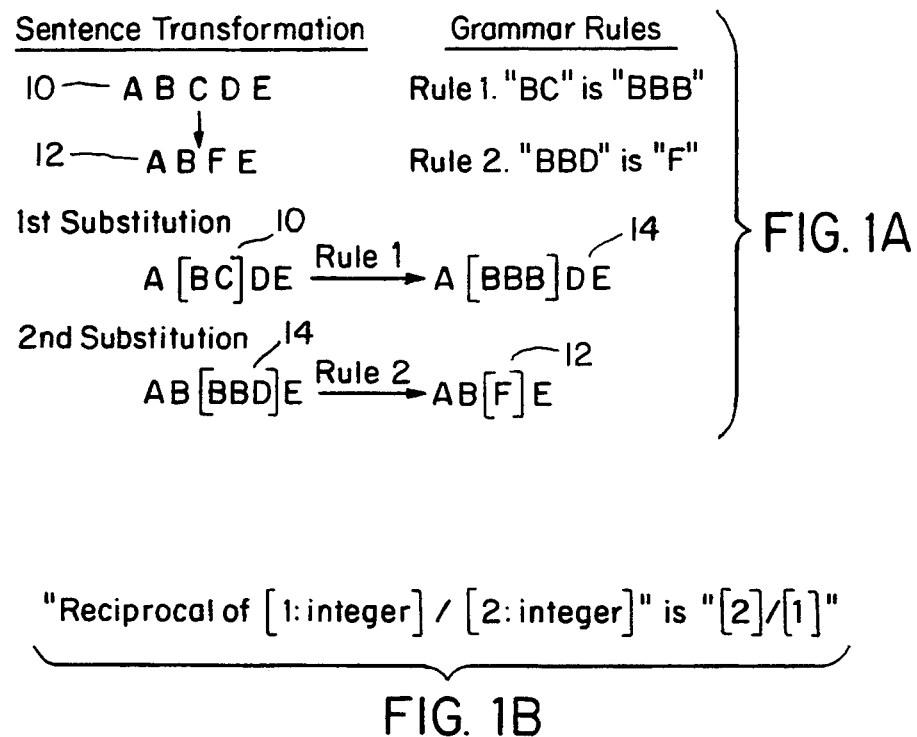
FIG. 1A
FIG. 1B
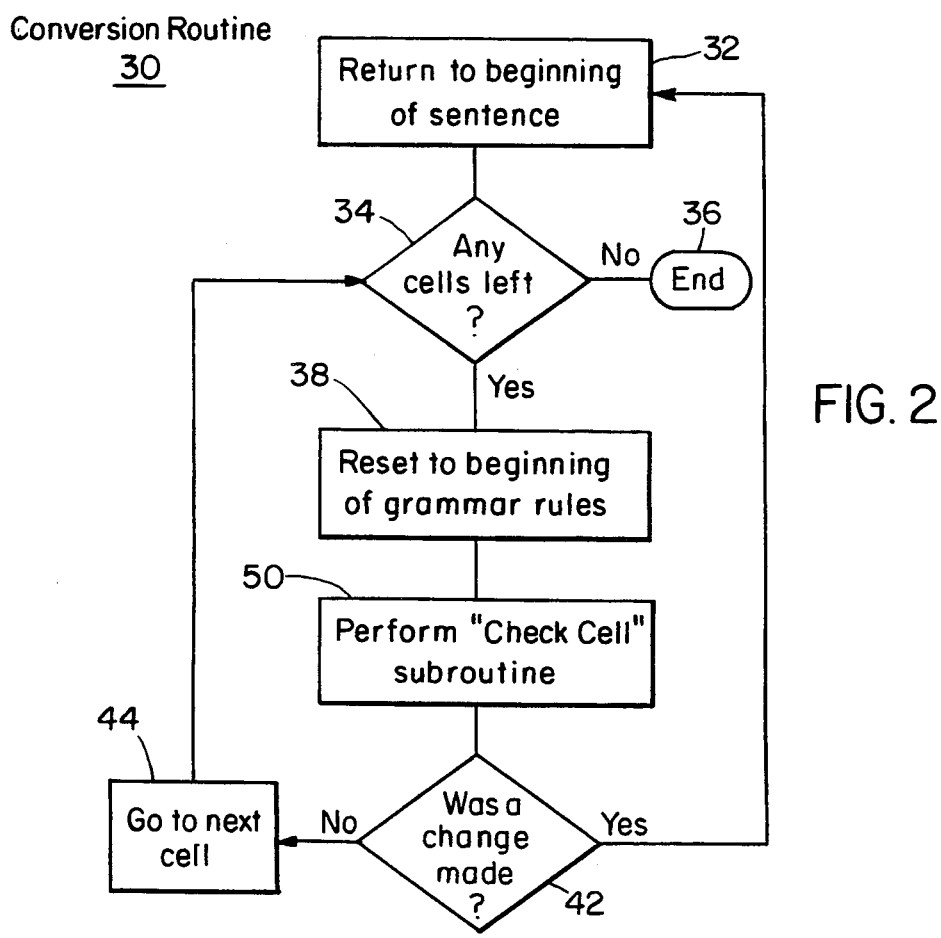
FIG. 2

SYSTEM AND METHOD FOR CONVERTING SENTENCE ELEMENTS UNRECOGNIZABLE BY A COMPUTER SYSTEM INTO BASE LANGUAGE ELEMENTS RECOGNIZABLE BY THE COMPUTER SYSTEM

FIELD OF INVENTION

This invention relates to a system and method for converting an unrecognizable word string into a modified string composed of operative elements recognizable by a computer system.

BACKGROUND OF INVENTION

Computers have traditionally been programmed to recognize a very limited set of input terminology, semantics and syntax. This limitation has required the user to learn the recognition rules before using the computer system. Many such systems recognize few if any terms that would be considered normal English language terms, requiring intensive training before operation. Even systems which do recognize terms or phrases found in the English language, such as the Basic programming language, require the input stream to be presented in exactly the recognizable form. Accordingly, even these systems require extensive user training.

To overcome such problems, natural language processing systems have been developed. Such systems are based on a context free grammar that describes the English language, or a subset of the English language that the system can understand. However, if the input stream is not in the language defined by this context free grammar, the system is not able to process the input. Accordingly, even these natural language processing systems impose restrictions on the user in relation to the input format. Accordingly, there is a need for a system that can process any sentence written in English.

SUMMARY OF INVENTION

It is therefore an object of this invention to provide a system and method for converting inoperative sentence elements into operative elements that allows for use of English language computer input streams.

It is a further object of this invention to provide such a system and method that allows virtually anyone who knows the English language to use a computer.

It is a further object of this invention to provide such a system and method that does not require the user to learn a computational language before use.

This invention results from the realization that a system that accepts as computer input virtually any English language expression may be accomplished by transforming the expression into a base language understood by the system by applying expression rewrite rules that recognize patterns of language elements and replace those patterns sequentially and exhaustively to fully convert the sentence to the base language.

This invention consists essentially of a system and method for converting inoperative sentence elements into operative elements including means for establishing a set of grammar rules for substituting sentence elements with different elements, means for sequentially comparing each grammar rule to the sentence elements to find a match between a grammar rule and one or more contiguous sentence elements, means for substituting the different elements for the matched elements, and means for continuing the sequential comparison and substitution for the entire series of sentence elements to fully convert the sentence to operative elements.

The grammar rules preferably include patterns composed of subpatterns recognizable by the system, as well as pattern substitution instructions. The sequential comparison may then be accomplished by comparing the first subpattern of each grammar rule sequentially to each of the sentence elements until a match is found. When a match is found, the next subpattern of the matching grammar rule is compared to the next sentence element until the pattern ends, indicating that there has been an exact match between the grammar rule pattern and one or more contiguous sentence elements, or a subpattern and sentence element do not match, indicating that there will not be such an exact match. When there is an exact match, the substituted pattern defined in the grammar rule under consideration is substituted for the match pattern of the sentence to modify the sentence. Such sequential comparison and substitution is continued until there are no matches between any of the grammar rules and the sentence, indicating that the transformation is complete.

DISCLOSURE OF PREFERRED EMBODIMENT

Other objects, features and advantages will occur to those skilled in the art from the following description of a preferred embodiment and the accompanying drawings, in which:

FIG. 1A illustrates conceptually a simple example of a sentence transformation accomplished by the system and method of this invention;

FIG. 1B illustrates a grammar rule useful for converting a mathematical expression;

FIG. 2 is a flow chart of the system and method of this invention;

Figure 4:
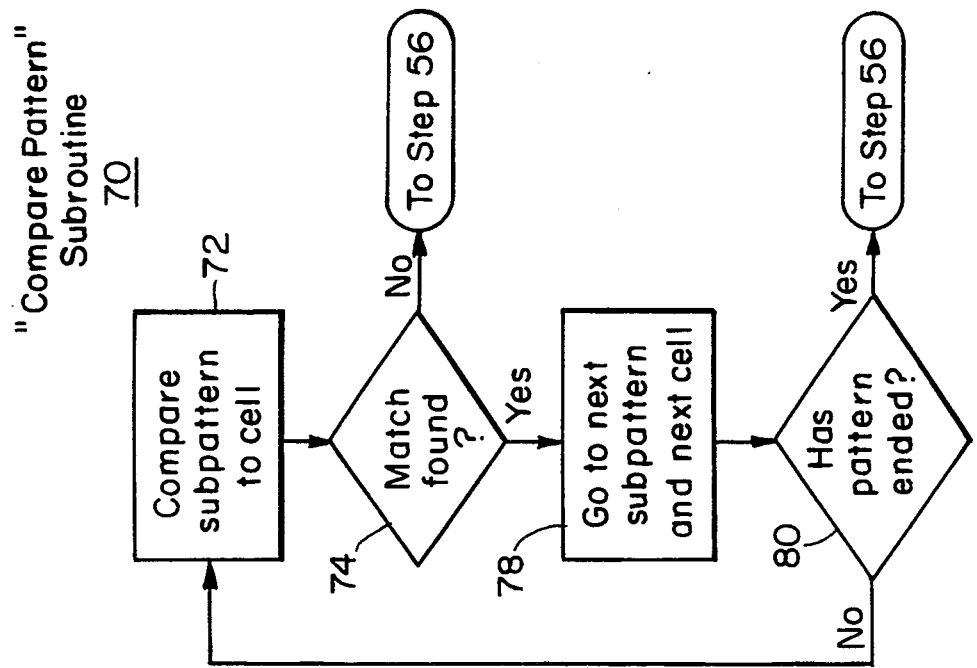
FIG. 4 is a flow chart of the compare pattern routine of the system of FIG. 3.

This invention features a system and method for converting an English language expression that contains unrecognizable elements into a string of operative elements that may be processed by a computer. Accordingly, this invention provides the user with the ability to input virtually any English language expression into a computer system, thereby obviating the need for memorization of acceptable system input stream rules before use.

An English language expression that may be accepted by the system comprises a string of elemental cells or tokens, as is known by those skilled in the art. These cells or tokens may also be referred to as sentence elements. A token may be a word, number, mathematical operator, or punctuation symbol, for example. Any sentence may be represented as a series of tokens, for example sentence 10, FIG. 1, consisting of tokens sentence elements or cells A, B, C, D, and E. String of cells 10 is transformed by the system and method of this invention into transformed sentence 12 comprising cells A, B, F, and E, each of which is a cell recognized by the system base language. Accordingly, sentence 12 is capable of being operated on by a computer employing the base language.

Sentence 10 is transformed into sentence 12 by applying a set of rewrite rules. These re-write rules allow an inputted sentence of elements unrecognizable by a computer system to be transformed into the system base language. These re-write rules may also be called grammar rules and are referred to as such throughout the remainder of the specification. Each grammar rule includes a pattern comprised of one or more subpatterns, each comprising one or more cells, and a transformation rule that consists of one or more cells to be substituted for the pattern defined by the rule. For example, as shown in FIG. 1A, rule 1 includes the pattern "BC" composed of subpattern B and subpattern C. The transformational rule of grammar rule 1 is the substitution of cell pattern "BBB" for pattern "BC". Similarly, rule 2 defines cell pattern "BBD" and mandates the substitution therefor with cell "F".

In making the transformation, the system, as described in more detail below, sequentially compares all of the grammar rules to each of the sentence cells until a match is found. The comparison then continues between that matching grammar rule and the next sentence cell or cells. When an entire grammar rule pattern has been matched, the system then accomplishes the substitution defined by the grammar rule and returns to the first cell of the sentence, and the first grammar rule. The sequential comparison and substitution is then continued until there are no rules that can be applied to the sentence, and the transformation is complete.

In the example of FIG. 1A, the first subpattern "B" of grammar rule 1 is compared to the first cell "A" of sentence 12. Since no match is found, the first subpattern "B" of rule 2 is compared to first cell "A" of sentence 10. Since again not match is found, the system continues the sequential comparison of the first subpattern of each of the grammar rules to the next cell "B" of sentence 10. Since subpattern "B" of rule 1 matches this cell, the system identifies rule 1 as a possible match and continues the comparison of the entire pattern "BC" of grammar rule 1 to the identified sentence element "B", and the immediately following elements. Thus, the system looks for a match between subpattern "C" and sentence element "C". As this is the end of the pattern in grammar rule 1, the system then accomplishes the substitution directed by that grammar rule, and substitutes elements "BBB" for elements "BC".

The second substitution resulting in a fully transformed sentence 12, which includes only base language cells that may be operated on by a system that operates in the base language, is accomplished in this case by grammar rule 2. Rule 2 has element pattern "BBD" that is matched to elements "BBD" in partially substituted sentence 14 to provide fully transformed sentence 12. Sentence 12 is fully transformed because none of the grammar rules can be applied to the element string "ABFE".

FIG. 1B illustrates one example of an English language grammar rule for the system and method of this invention that provides for the recognition of an English language phrase and converts it into base language terms which may be operated on by a computer system using the base language. Thus, the grammar rule depicted in FIG. 1B would allow the user to enter an expression such as "reciprocal of 6/4", which would be converted to "4/6" which is a mathematical expression recognized by the system.

Figure 3:
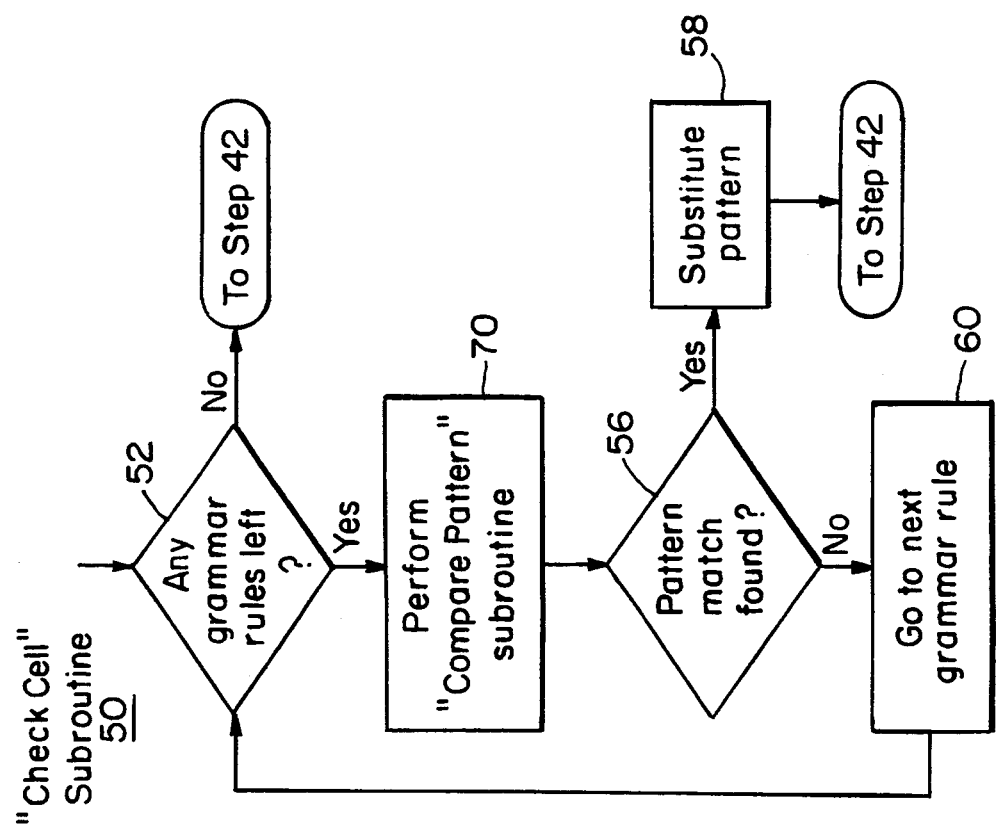
FIG. 3 is a flow chart of the check cell routine of the system of FIG. 2.

The system and method of this invention are accomplished by the three routines shown in FIGS. 2–4. Conversion routine 30, FIG. 2 begins by returning to the beginning of the sentence under review. This step is accomplished at the beginning of the sentence review, as well as after each substitution made as a result of a match of one or more contiguous sentence cells with a grammar rule pattern. At step 34, if there are no cells left in the sentence, the transformation is complete, step 36. If there are cells left, the system resets to the beginning of the list of grammar rules, step 38, and performs the check cell subroutine 50, FIG. 3.

In subroutine 50, if there are grammar rules left to be compared to the sentence cell, step 52, the system performs the compare patterns of subroutine 70, FIG. 4. If there are no grammar rules left, the system continues on to step 42 of conversion routine 30, FIG. 2.

Compare pattern subroutine 70, FIG. 4, attempts the comparison of an entire pattern of a grammar rule to one or more contiguous sentence cells by first comparing the first subpattern of the first grammar rule to the first cell, step 72. If a match is found, step 74, the next subpattern of the pattern of the grammar rule being operated on, and the next cell of the sentence, are retrieved. If the pattern has ended, there has been an exact match between the grammar rule pattern and the contiguous sentence cells, and the system returns to step 56, FIG. 3, for substitution of the matched pattern with the substituted pattern as defined by the grammar rule under consideration, step 58.

If the pattern has not ended, the comparison between the entire pattern of the grammar rule under consideration to contiguous sentence cells has not been completed, and the system returns to step 72 to accomplish the sequential comparison of the subpatterns of the entire pattern of the grammar rule under consideration to contiguous sentence cells until either there is a full match or not.

At any point at which there is no match between a subpattern and the next sentence cell, step 74, operation continues to step 56, FIG. 3, and since there has been no match between the entire pattern of the grammar rule under consideration and one or more contiguous sentence cells, the system moves to the next grammar rule, step 60. If there are grammar rules left, step 52, the system reperforms the compare pattern subroutine 70 on the next grammar rule.

Accordingly, in total, conversion routine 30 performs a sequential comparison of the first subpattern of each grammar rule to the first cell of the sentence, and then a sequential comparison of the first subpattern of each grammar rule to the second sentence cell, and so forth, until there are no matches found between any of the grammar rule patterns and the sentence, indicating that the transformation is complete. By providing grammar rules that include patterns of English language elements that are converted under direction of the grammar rules to other English language elements and/or base language elements recognizable by the computer system, the system and method of this invention provides the ability to transform any English language sentence into the base language recognizable by the computer system, thus allowing the system to accept and operate on any English language phrase.

Figure 5:
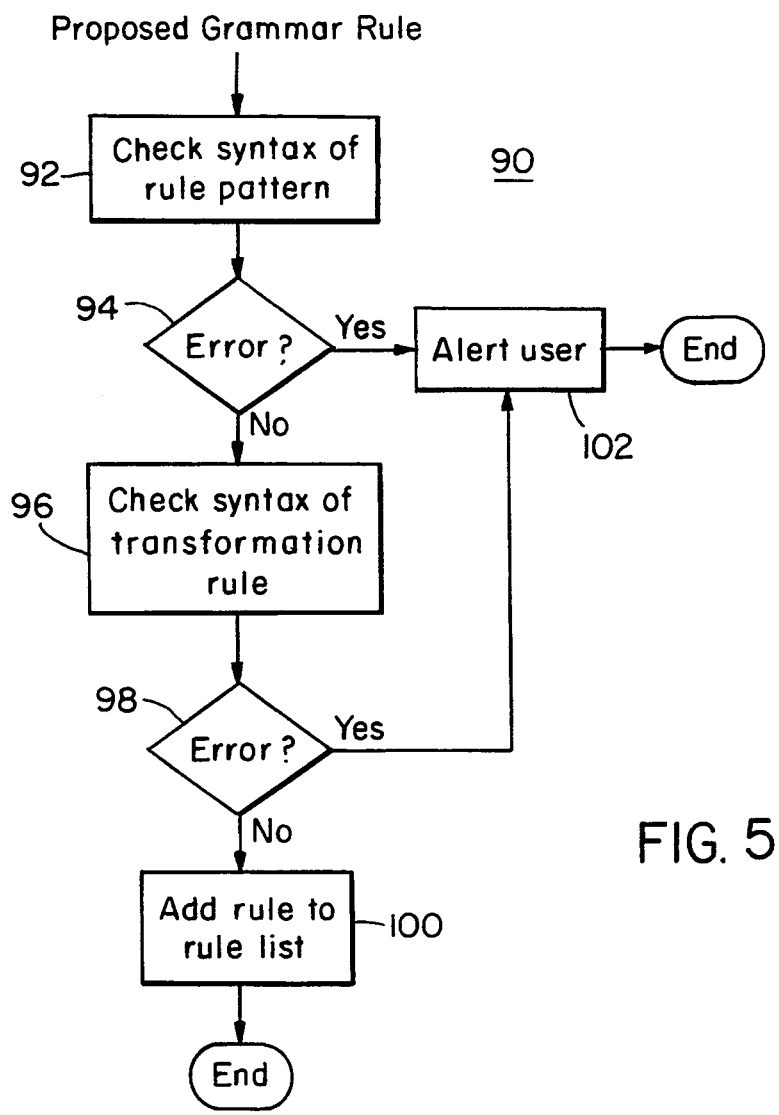
FIG. 5 is a flow chart of a routine for automatically checking the syntax of a proposed grammar rule to be added to the list of rules for use in this invention.

FIG. 5 illustrates routine 90 for reviewing a grammar rule that a user desires to add to the list of grammar rules in the system to make sure that it complies with the syntax requirements for the system grammar rules. Table I below details the allowed syntax form for grammar rules. Most basically, each grammar rule must include a pattern and a rewrite rule (transformation rule). The grammar rule must be of the form: "pattern" is "rewrite rule". When the user attempts to input a new grammar rule, routine 90 is initiated to perform a syntactical check of the "pattern" portion of the grammar rule and then the "rewrite rule" portion of the grammar rule based upon the grammar rule syntax check compare list of Table I.

TABLE I

| Term | Syntax Check Compare List<br>Allowed Form |
|---|---|
| Grammar Rule | "{Precedence} { } Pattern { }" is "Rewrite Rule" |
| Precedence | [N] |
| N | any integer such that: 0<N<1000 grammar rule must match on sentence start |
| Pattern | {Pattern Variable \| Exact Text \| Optional Text Exclusive Text}+ |
| Pattern Variable | [Index: {#} Variable Group] |
| Index | N and also must be unique within Pattern |
| # | allow multiple, sequential matches of pattern |
| Variable Group | { }{Modifier} Variable \|<br>{ }{Modifier} Variable Boolean Variable Group<br>negate match (ie TRUE if doesn't match pattern) |
| Modifier | {Number} {Gender} {Inflection} |
| Number | singular \| plural \| numberless |
| Gender | masculine \| feminine \| androgynous \| neuter |
| Inflection | comparative \| normative \| objective \| past \| past participle \| person-related \| place-related \| possessive \| present \| present particple \| reflexive \| subjective \| superlative \| thing-related \| time related |
| Variable | Dictionary or Databook entry |
| Boolean | & (and)<br>\| (or)<br>Ω (xor) |
| Exact Text | any sequence of keyboard characters |
| Optional Text | 'Optional List' |
| Optional List | Exact Text \| Exact Text, Optional List |
| Exclusive Text | '@ Optional List'<br>pattern must exhaust all tokens in sentence |
| Rewrite Rule | {Index Reference \| Exact Text}+ |
| Index Reference | [Index] (must reference like Index in Pattern) |

Key:
( ) explanatory only.
{ } represents an optional elements of the grammar rule.
{ }+ entry(ies) between these brackets must have one or more instances.
| entries separated by this symbol indicates that only one of the symbols can be present.

In step 92 the system checks the syntax of the pattern portion of the rule and if there is no error, step 94, the syntax of the transformation rule or rewrite rule portion of the grammar rule is checked, step 96, and if that is acceptable, step 98, the rule is added to the list of rules and the routine ends. If either the rule pattern or the transformation rule portion of the grammar rule does not meet the syntactical requirements of Table I, the user is alerted, step 102, and the routine ends. Accordingly, routine 90 allows the insertion into the grammar rules only of grammar rules having an acceptable syntactical form so that the user may build a grammar rules list that accomplishes transformation of English language terms to base language terms in relation to the form of input the user desires and the acceptable base language form.

The "optional list" term of Table I has an allowed form that includes "exact text". Exact text is one or more keyboard characters that are exactly matched. The term "variable" has an allowed form of "dictionary or databook entry" meaning that the form is that of an entry in the system memory portions called "dictionary" or "databook". For example, the system dictionary may include commonly used terms such as "the" as well as arithmetic operators and the names of parts of speech.

Figure 6:
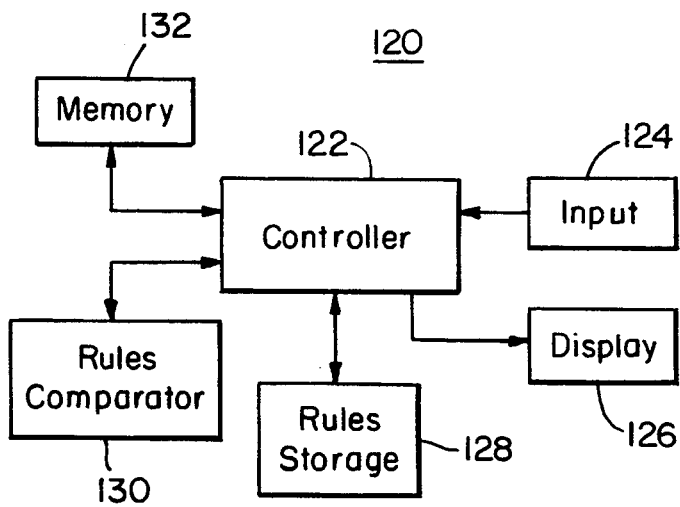
FIG. 6 is a block diagram of a system for accomplishing this invention.

FIG. 6 shows in block form system 120 for accomplishing this invention including controller 122 which accepts input 124. System 120 further includes a display for providing operator feedback. Rule storage 128 and memory 132 include the grammar rules, the syntactical check compare list and other forms of memory such as the dictionary and databook that are used by comparator 130 for performing the syntactical check of new grammar rules and the sequential comparison of the grammar rules to the sentence elements for converting inoperative sentence elements into operative elements.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A system for converting sentence elements unrecognizable by a computer system into base language elements recognizable by the computer system, comprising:

means for establishing and storing within the computer system a set of rules for substituting said unrecognizable sentence elements with said base language elements;

means for inputting a sentence of said unrecognizable sentence elements into said computer system;

means for sequentially comparing each rule to each said inputted unrecognizable sentence element to find a match between a rule and one or more contiguous unrecognizable sentence elements;

means for substituting the inputted unrecognizable sentence elements matching the rule with the base language elements as defined by the matching rule; and means for continuing the sequential comparison and substitution of the said base language elements for said unrecognizable sentence elements to fully convert the sentence to base language elements recognizable by said computer system.

2. The system of claim 1 in which the rules include patterns of unrecognizable sentence elements composed of sub-patterns of individual unrecognizable sentence elements, and pattern substitution instructions for substituting a matched pattern of unrecognizable sentence elements with said base language elements.

3. The system of claim 2 in which said means for sequentially comparing includes means for comparing a first sub-pattern of each grammar rule to a first inputted unrecognizable sentence element until a match is found.

4. The system of claim 3 in which said means for sequentially comparing further includes means for comparing each sub-pattern succeeding said first sub-pattern of the matching rule to each inputted unrecognizable sentence element succeeding said first inputted unrecognizable sentence element until the sub-patterns and elements no longer match or the pattern ends.

5. The system of claim 4 in which said means for substituting is responsive to said means for sequentially comparing for substituting the inputted unrecognizable sentence elements matching the pattern of the rule with base language elements as defined by the rule.

6. The system of claim 3 in which said means for continuing the sequential comparison and substitution includes means for comparing the first sub-pattern of each rule to the next inputted unrecognizable sentence element to find additional matches.

7. The system of claim 6 in which said means for continuing the sequential comparison and substitution further includes means for comparing, for each additional match found, the next sub-pattern of the matching rule to the next inputted unrecognizable sentence element until the sub-patterns and elements no longer match, or the pattern ends.

8. The system of claim 7 in which said means for continuing further includes means for substituting the inputted unrecognizable sentence elements matching the pattern of the rule with said base language elements as defined by the matching rule.

9. A system for converting sentence elements unrecognizable by a computer system into base language elements recognizable by the computer system, comprising:
- means for establishing and storing within said computer system a set of rules, each having a pattern of unrecognizable sentence elements composed of sub-patterns of individual unrecognizable sentence elements, and pattern substitution instructions for substituting a pattern of inputted unrecognizable sentence elements with said base language elements;
- means for inputting said unrecognizable sentence elements into said computer system;
- means for comparing a first sub-pattern of each rule sequentially to each of the inputted unrecognizable sentence elements until a match is found;
- means for comparing each sub-pattern succeeding said first sub-pattern of the matching rule to each inputted unrecognizable sentence element succeeding said first inputted unrecognizable sentence element until the sub-patterns and elements no longer match, or the entire pattern is matched; and
- means for substituting the inputted unrecognizable sentence elements matching the pattern with said base language elements as defined by the matching rule.

10. A system for converting sentence elements unrecognizable by a computer system into base language elements recognizable by said computer system, comprising:
- means for establishing and storing within said computer system a set of rules, each having a pattern of unrecognizable sentence elements composed of sub-patterns of individual unrecognizable sentence elements, and pattern substitution instructions for substituting inputted unrecognizable sentence elements with base language elements;
- means for inputting a sentence of said unrecognizable sentence elements into said computer system;
- means for comparing a first sub-pattern of each rule sequentially to a first inputted unrecognizable sentence element until a match is found;
- means for comparing each sub-pattern succeeding said first sub-pattern of the matching rule to each inputted unrecognizable sentence element succeeding said first inputted unrecognizable sentence element until the sub-patterns and elements no longer match, or the entire pattern is matched;
- means for substituting the inputted unrecognizable sentence elements matching the pattern with said base language elements as defined by the matching rule; and
- means for continuing the sequential comparison, comparison of the next sub-pattern, and substitution until there are no more matches between any rule pattern and any set of contiguous inputted unrecognizable sentence elements for fully converting the inputted unrecognizable sentence to base language elements recognizable by said computer system.

11. A method for converting sentence elements unrecognizable by a computer system into base language elements recognizable by said computer system, comprising:
- establishing and storing within said computer system a set of rules for substituting said inputted unrecognizable sentence elements with said base language elements;
- inputting a sentence of said unrecognizable sentence elements into said computer system;
- sequentially comparing each rule to each said inputted unrecognizable sentence element to find a match between a rule and one or more contiguous unrecognizable sentence elements;
- substituting the inputted unrecognizable sentence elements matching the rule with the base language elements as defined by the matching rule; and
- continuing the sequential comparison and substitution of base language elements for inputted unrecognizable sentence elements to fully convert the sentence to base language elements recognizable by the computer system.

12. The method of claim 11 in which the rules include patterns of unrecognizable sentence elements composed of sub-patterns of individual unrecognizable sentence elements, and pattern substitution instructions for substituting a matched pattern of inputted unrecognizable sentence elements with base language elements.

13. The method of claim 12 in which sequentially comparing includes comparing a first sub-pattern of each rule to a first inputted unrecognizable sentence element until a match is found.

14. The method of claim 13 in which sequentially comparing further includes comparing each sub-pattern succeeding said first sub-pattern of the matching rule to each inputted unrecognizable sentence element succeeding said first inputted unrecognizable sentence element until the sub-patterns and elements no longer match, or the pattern ends.

15. The method of claim 14 in which the step of substituting is responsive to the sequential comparison for substituting inputted unrecognizable sentence elements matching the pattern of the matching rule with base language elements as defined by the rule.

16. The method of claim 12 in which continuing the sequential comparison and substitution includes comparing the first sub-pattern of each rule to the next inputted unrecognizable sentence element to find additional matches.

17. The method of claim 16 in which continuing the sequential comparison and substitution further includes comparing, for each additional match, the next sub-pattern of the matching rule to the next inputted unrecognizable sentence element until the sub-patterns and elements no longer match, or the pattern ends.

18. The method of claim 17 in which continuing the sequential comparison and substitution further includes substituting inputted unrecognizable sentence elements matching the pattern of the matching rule with said base language elements as defined by the matching rule.

19. A method of converting sentence elements unrecognizable by a computer system into base language elements recognizable by the computer system, comprising:
   establishing and storing within said computer system a set of rules, each having a pattern of unrecognizable sentence elements composed of sub-patterns of individual unrecognizable sentence elements and pattern substitution instructions for substituting a pattern of inputted unrecognizable sentence elements with base language elements;
   inputting said unrecognizable sentence elements into said computer system;
   comparing a first sub-pattern of each rule sequentially to each of the inputted unrecognizable sentence elements until a match is found;
   comparing each sub-pattern succeeding said first sub-pattern of the matching rule to each inputted unrecognizable sentence element succeeding said first inputted unrecognizable sentence element until the sub-patterns and elements no longer match, or the entire pattern is matched; and
   substituting the inputted unrecognizable sentence elements matching the pattern of the rule with said base language elements as defined by the matching rule.

20. A method for converting sentence elements unrecognizable by a computer system into base language elements recognizable by said computer system, comprising:
   establishing and storing within said computer system a set of grammar rules, each having a pattern of unrecognizable sentence elements composed of sub-patterns of individual unrecognizable sentence elements, and pattern substitution instructions for substituting inputted unrecognizable sentence elements with base language elements;
   inputting a sentence of said unrecognizable sentence elements into said computer system;
   comparing a first sub-pattern of each rule sequentially to a first inputted unrecognizable sentence element until a match is found;
   comparing each sub-pattern succeeding said first sub-pattern of the matching rule to each inputted unrecognizable sentence element succeeding said first inputted unrecognizable sentence element until the sub-patterns and elements no longer match, or the entire pattern is matched;
   substituting the inputted unrecognizable sentence elements matching the pattern of the rule with said base language elements as defined by the matching rule; and
   continuing the sequential comparison, comparison of the next sub-pattern, and substitution, until there are no more matches between any rule pattern and any set of contiguous inputted unrecognizable sentence elements for fully converting the inputted unrecognizable sentence to base language elements recognizable by said computer system.

* * * * *